US006799620B2

(12) United States Patent
Takekoshi

(10) Patent No.: US 6,799,620 B2
(45) Date of Patent: Oct. 5, 2004

(54) IMAGE FORMING APPARATUS

(75) Inventor: Nobuhiko Takekoshi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 10/082,179

(22) Filed: Feb. 26, 2002

(65) Prior Publication Data

US 2002/0118987 A1 Aug. 29, 2002

(30) Foreign Application Priority Data

Feb. 28, 2001 (JP) ....................................... 2001-054918

(51) Int. Cl.[7] .......................... B32B 35/00; B41F 23/04; B41L 23/20

(52) U.S. Cl. ....................................... 156/384; 156/387

(58) Field of Search ................................ 156/155, 277, 156/308.2, 309.9, 323, 324.4, 350, 359, 384, 386, 387

(56) References Cited

U.S. PATENT DOCUMENTS 4,242,271 A 12/1980 Weber et al. ............... 260/448
4,879,268 A * 11/1989 Sheldon ....................... 503/201
4,985,720 A * 1/1991 Masuda et al. ............. 396/572
5,217,561 A * 6/1993 Ueda et al. ................. 156/359
5,574,538 A * 11/1996 Takahashi et al. ............ 399/71

FOREIGN PATENT DOCUMENTS

JP 62233264 A * 10/1987 .............. B41J/3/20

* cited by examiner

*Primary Examiner*—Richard Crispino
*Assistant Examiner*—Sing P. Chan
(74) *Attorney, Agent, or Firm*—Fitzpatrick, Cella, Harper & Scinto

(57) ABSTRACT

A laminating apparatus includes a conveyor for conveying a laminating object, a dryer for drying the laminating object conveyed by the conveyor, and a laminate device for effecting laminate processing on the laminating object dried by the dryer. A controller controls a temperature of the dryer so that the temperature of the dryer is adjusted to a predetermined temperature T1 before the laminating object arrives at the dryer, and so that the temperature of the dryer is adjusted to a predetermined temperature T2 greater than the temperature T1 when the laminating object is being dried by the dryer.

7 Claims, 9 Drawing Sheets

IMAGE FORMING APPARATUS

BACKGROUND OF THE INVENTION

1. Field of the Invention

The present invention relates to an image forming apparatus in which an image formed surface is subjected to laminate processing, and more particularly, it relates to an image forming apparatus comprising a recording portion for effecting recording on a recording medium by discharging ink from a recording means and a laminating portion for effecting laminate processing on the recording medium after image formation.

2. Related Background Art

Image forming apparatuses having a printer function, a copier function or a facsimile function, or image forming apparatus used as an output equipment of a composite electronic device including a computer or a word processor, an output equipment of a work station or an output equipment of a digital camera, have been designed to form an image (including characters and/or symbols) on a recording medium such as a recording paper or a plastic sheet in response to image information. Such image forming apparatuses can be classified into ink jet type, wire dot type, thermal type and laser beam type in dependence upon their recording systems.

Among them, an image forming apparatus of ink jet type (ink jet recording apparatus) is designed to form the image on the recording medium by discharging ink from recording means (recording head) so that the recording means can be made compact, a highly fine image can be formed at a high speed and the image can be formed on a plain (normal) paper without special processing. Further, there are advantages that a running cost is low, noise is reduced due to a non-impact system and a color image can easily be formed by using plural kinds of inks (for example, color inks).

However, since the ink jet recording apparatus mainly uses liquid ink, in order to obtain a high quality image, one of important subjects is how to dry the ink properly. It is general to use a recording medium having an ink receiving layer in order to obtain the high quality image. However, since the ink receiving layer is apt to absorb the ink, if the recording medium is wetted by water after the image formation, the ink will be solved to distort the image or reduce density or to transfer the image also to a rear surface of the recording medium or curl the recording medium. On the other hand, if dye having good color reproduction is used, although sharp color saturation can also be achieved, due to illumination of light and gas such as ozone, dye attack is generated to cause discoloring.

In order to solve these problems, there has been proposed an apparatus for laminating an imaged surface with a film. Since the imaged surface can be covered by lamination, excellent water proof and gas proof can be achieved, and a light-resistance property can be enhanced by using UV cut material in the laminate layer, thereby improving weather-resistance totally. Further, good appearance and quality can be added to the output image by changing surface properties (for example, mirror surface property, mat property and the like) of the laminate layer and/or color and thickness of the laminate itself.

FIG. 9 shows a conventional laminating apparatus. A recording medium 213 is conveyed in a direction shown by the arrow P. When the recording medium is located at a position 213*a*, an image has already been formed on an upper surface of the recording medium. Moisture included in the recording medium 213 is evaporated by passing the recording medium 213 through a nip between an upper drying roller 200 and a lower drying roller 201. A heat source for evaporating the moisture is a heater 210 using halogen. A temperature of the heater 210 is set to any set temperature by a temperature measuring element such as a thermistor (not shown) and a control circuit for switching the heater to turn ON/OFF in response to a temperature signal from the thermistor. When the recording medium 213 is conveyed to the nip of the pair of the drying rollers 200, 201, the recording medium 213 is heated and dried. In this case, since vapor is generated, surrounding air is discharged toward a direction shown by the arrow Q by means of a fan 207.

The dried recording medium 213 is guided by a convey guide 208 to be conveyed into a nip between an upper laminate roller 202 and a lower laminate roller 203. A laminate material 204 having a laminate layer is wound around a feeding roller 205. The upper laminate roller 202 includes a heater 211 therein and a temperature of the heater 211 is controlled to a predetermined value. When the recording medium 213 and the laminate material 204 are conveyed to the nip of the pair of laminate rollers 202, 203, the laminate layer of the laminate material 204 is adhered to a recorded surface of the recording medium 213. The laminate material 204 is cut by a cutter (not shown) when the laminate material passes through a pair of discharge rollers 206, thereby completing a recorded product having the recorded surface covered by the laminate layer.

However, the conventional image forming apparatus had the following problems. In the conventional image forming apparatus, the recording medium was dried by the pair of drying rollers before the lamination. In order to improve through-put of the image forming apparatus, it is required that the recording medium which absorbed liquid such as ink be dried quickly. In order to dry the recording medium adequately, it is general that the heating temperature of the drying roller pair is increased or a width of the nip between the drying roller pair and the recording medium is increased. However, if the heating temperature of the drying roller pair is increased, since temperatures of a back coat layer for increasing the quality after the output and of the material itself of the recording medium are also increased, there arose a problem that kinds of available recording media are limited. Further, there arose a problem that moisture is trapped between the back coat layer and the base material of the recording medium, with the result that a surface layer of the rear surface is partially swollen to deteriorate the quality greatly or to generate poor conveyance. Further, if the contact area between the drying roller pair and the recording medium is increased, there arose a problem that the apparatus itself becomes large-sized due to lengthened diameters of the drying rollers and a complicated arrangement for winding the recording medium around the roller is required. Further, if the heating temperature of the drying roller pair is increased, there arose a problem that power consumption of the apparatus is increased.

SUMMARY OF THE INVENTION

An object of the present invention is to provide an image forming apparatus in which a laminating speed can be increased without becoming the apparatus large-sized and useless energy consumption can be reduced while maintaining a required drying amount.

Another object of the present invention is to provide an image forming apparatus comprising laminate object conveying means for conveying an object to be laminated (referred to as "laminate object"), laminate means for effecting laminate processing on the laminate object, drying means for drying the laminate object before the laminate object is laminated by the laminate means, and means for changing a temperature of the drying means between before and when the laminate object is conveyed to the drying means.

DETAILED DESCRIPTION OF THE PREFERRED EMBODIMENTS

The present invention will now be fully explained in connection with preferred embodiments thereof with reference to the accompanying drawings.

First Embodiment

Figure 1:
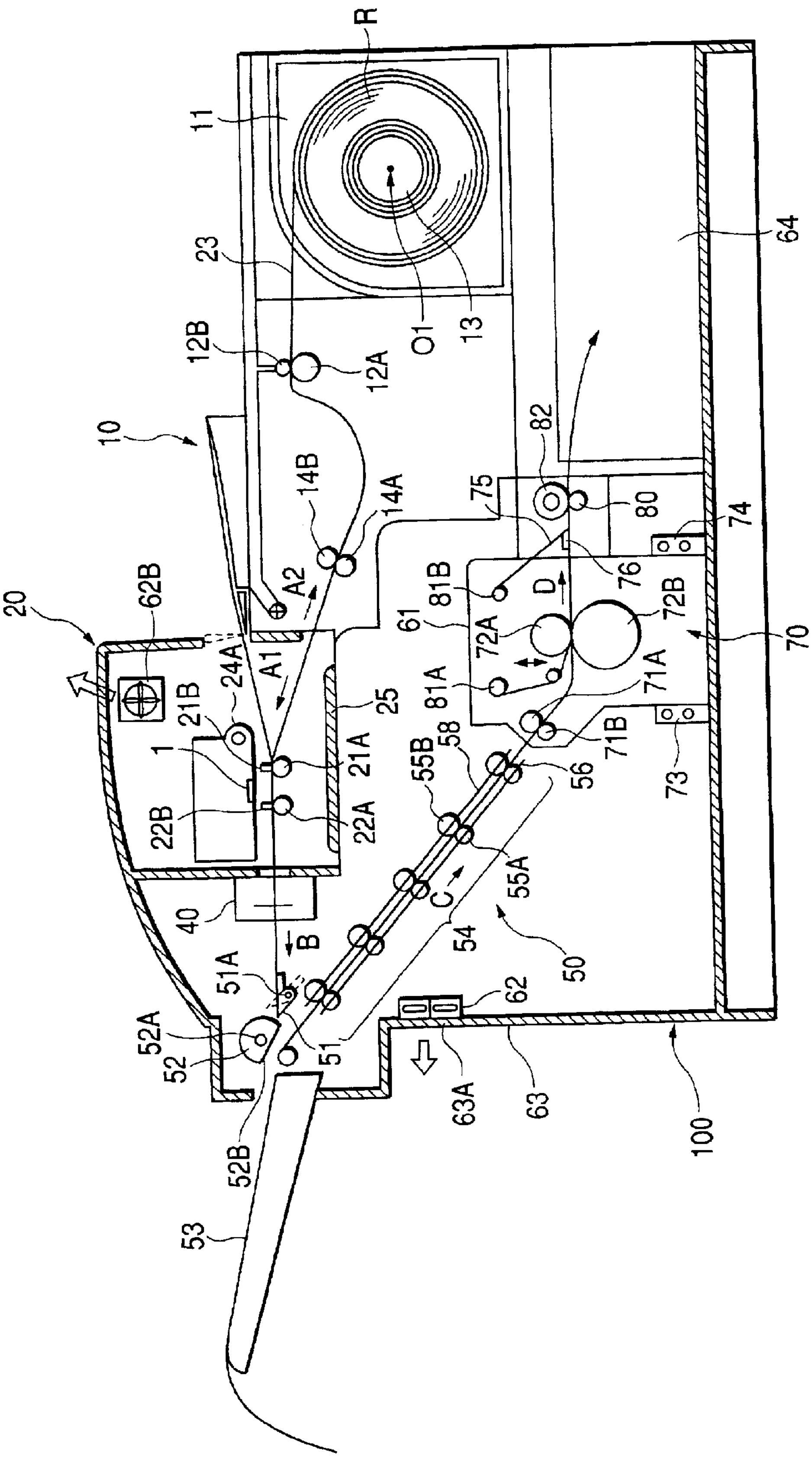
FIG. 1 is a sectional view of an image forming apparatus according to a first embodiment of the present invention.

Now, a first embodiment of the present invention will be explained with reference to FIGS. 1 to 4. FIG. 1 is a sectional view of an image forming apparatus 100 according to the first embodiment of the present invention. The image forming apparatus 100 includes a recording portion for effecting recording by discharging ink from an ink jet recording head onto a recording medium, and a laminating portion for laminating the recording medium and a laminate material.

Figure 2:
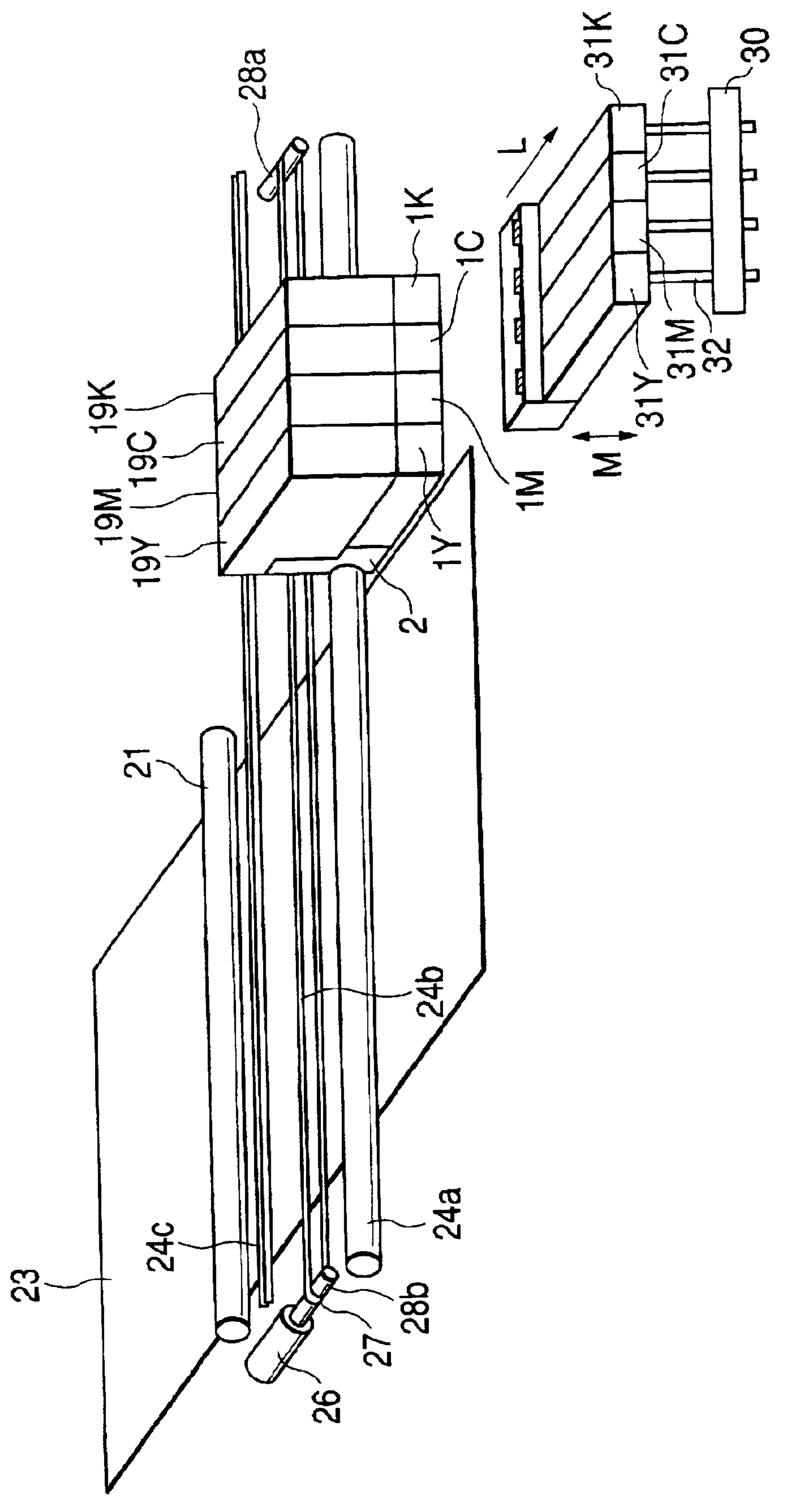
FIG. 2 is a perspective view for explaining a recording portion according to the first embodiment of the present invention.

First of all, the recording portion will be described with reference to FIG. 2. In FIG. 2, recording head is for effecting the recording by discharging inks can discharge yellow (Y) ink, magenta (M) ink, cyan (C) ink and black (K) ink. Ink tanks 19 serve to supply the inks to the recording heads 1. The recording heads 1 are communicated with the ink tanks 19 through ink flow paths therein. A conveying roller 21 is driven by a convey motor (not shown) to convey a recording medium 23. The recording heads 1 are mounted on a carriage 2 which is reciprocally shifted while being guided by a guide rail 24*a*. A carriage motor 26 serves to apply a driving force to the carriage 2. A timing belt 24*b* is wound around a pulley 28*b* provided on a motor shaft 27 of the carriage motor 26 and a pulley 28*b* provided in the apparatus. The timing belt 24*b* is fixedly connected to the carriage 2. When the carriage motor 26 is rotated, the carriage 2 on which the recording heads 1 are mounted is shifted reciprocally. As the carriage is shifted reciprocally, the recording heads discharges the inks onto the recording medium 23 to record an image on the recording medium. An encoder 24*c* serves to control a position and a speed of the carriage 2.

Caps 31 serves to prevent good discharge due to solidification and/or drying of ink in the recording heads 1. The cap 31 can be shifted in up and down directions shown by the arrow M by a driving force of a motor (not shown). The caps 31 closely contacted with an ink discharge face of the corresponding recording head 1 are sucked by means of a recovery pump 30. As a result, the inks in the recording heads 31 are sucked. The sucked inks are absorbed by waste ink absorbing member (not shown) through tubes 32. Blades 35 serves to wipe the inks adhered to the ink discharge faces of the recording heads 1 by a capping operation by shifting the blades in a direction shown by the arrow L. Second cleaning member for wiping the inks adhered to the blades 35 may be provided.

Next, an entire construction of the image forming apparatus 100 will be explained with reference to FIG. 1. In FIG. 1, the recording portion explained in connection with FIG. 2 is denoted by reference numeral 20. The image forming apparatus 100 includes a manual insertion guide 10 used when the recording medium is supplied manually, and a cartridge 11 containing a rolled recording medium (rolled paper). The rolled recording medium 23 is rolled in such a manner that a recording surface of the recording medium faces outwardly. A paper tube 13 on which the rolled recording medium is wounded is rotatably supported on a shaft O1 within the cartridge 11. The rolled recording medium 23 is fed out from the cartridge 11 by pairs of rollers 12A, 12B and 14A, 14B and is supplied to the recording portion 20.

On the other hand, when the recording medium is supplied manually, a cut recording medium is rested on the manual insertion guide 10. When the manual insertion is selected under instruction from a main body of the image forming apparatus or a controller for controlling the main body of the image forming apparatus, the rolled recording medium is shifted in a direction shown by the arrow A2 to be rewound up to the pair of rollers 14A, 14B. As a result, the recording medium can be inserted by the manual insertion guide 10. The recording medium supplied by either method is subjected to image formation by the inks discharged from ink discharge ports of the recording heads 1 at a location between a pair of convey rollers 21A, 21B and a pair of auxiliary convey rollers 22A, 22B.

A cutter unit 40 as cutting means has a cutter for cutting the rolled paper to a predetermined length after the image was recorded on the rolled paper. A switching lever 51 rotatable around a shaft 51A can be switched selectively between a rotational position shown by the solid line and a rotational position shown by the broken line in FIG. 1. When the recorded recording medium 23 is discharged from a direction shown by the arrow B, the switching lever 51 is switched to the rotational position shown by the solid line. A D-cut roller 52 having a D-shaped cross-section is rotatably supported on a shaft 52A. When the recorded recording medium 23 is discharged from the direction B, the D-cut roller 52 is positioned at a rotational position as shown. A flat cut surface 52B is formed on the D-cut roller 52. The recorded recording medium 23 is rested on a removable intermediate tray 53. For example, the intermediate tray 53 has a length corresponding to about A4 size so that, when the elongate recording medium 23 is rested on the intermediate tray, as shown, a portion of the recording medium is suspended from a tip end of the intermediate tray 53. After the recording medium on which the image was formed in the recording portion 20 is rested on the intermediate tray 53, the recording medium is conveyed into a convey path 54 which will be described later, by the rotation of the switching lever 51 in the rotational position shown by the broken line and an anti-clockwise rotation of the D-cut roller 52. Buffer means 50 serves to adjust a conveying speed of the recording medium between units. After the convey path 54 receives the recording medium 23 on which the image was formed in the recording portion 20, the convey path directs the recording medium 23 to a laminating portion 70 which will be described later.

The convey path 54 includes a plurality of pairs (five pairs in FIG. 1) of rollers 55A, 55B and a pair of guide plates 56. When the rollers pairs 55A, 55B are rotated by a motor (not shown), the recording medium on which the image was formed is fed in a direction shown by the arrow C. Elongated vent slots are formed in the guide plates 56. Further, if the recording medium 23 is jammed in the convey path 54, a space defined between the guide plates 56 can be exposed by opening the guide plate 56 by means of an appropriate mechanism (not shown).

A heat shielding member 61 is constituted, for example, by a member having a space capable of including an air layer for shielding heat therein and is located to partition the cartridge 11 containing the recording medium from the recording portion 20. The heat shielding member 61 serves to prevent the heat of the laminating portion 70 from conducting to the cartridge 11 and the recording portion 20. In the illustrated embodiment, the laminating portion 70 as a heat application processing portion is disposed below the recording portion 20 in order to make the entire image forming apparatus more compact. Thus, the heat generated by the laminating portion 70 warms air surrounding the laminating portion 70 and is ascended, thereby increasing a temperature of air surrounding the ink jet recording heads 1 disposed within the recording portion 20. However, since the heat shielding member 61 is provided for the partition, ink solvent in the ink discharge ports of the ink jet recording heads 1 is prevented to be evaporated, thereby preventing solidification of the ink and clogging of ink nozzles. Further, the recording medium within the cartridge 11 is prevented from being dried to curl the recording medium, and, when the recording medium includes a thermoplastic resin layer, the thermoplastic resin layer is prevented from being degraded by the heat from the heat application processing portion.

In FIG. 1, a waste ink storing member 25 for storing the waste ink collected by recovery processing using idle discharge or section for maintaining discharging performance of the ink jet recording heads 1 is disposed above the heat shielding member 61 and below or in the vicinity of the recording unit 20. It is desirable that the waste ink stored in the waste ink storing member 25 is evaporated naturally in order to maintain a waste ink storing ability of the waste ink storing member 25. If the waste ink is evaporated excessively more than a natural evaporating amount, image quality will be deteriorated due to a large amount vapor and water droplets. Thus, by arranging the waste ink storing member 25 above the heat shielding member 61, influence of the heat from the laminating portion 70 is reduced, thereby preventing excessive evaporation of the waste ink. Incidentally, the waste ink storing member 25 can be replaced by a new one if the waste ink storing ability is expired.

A fan 62 serves to send the heated air below the heat shielding member and above the laminating portion 70 toward the convey path 54. An outer frame cover 63 having a louver portion 63A is designed to so that the heated air passed through the elongated slots of the convey path 54 can be discharged smoothly out of the apparatus through the louver portion 63A.

The laminating portion 70 includes a pair of rotatable drying rollers 71A, 71B having heaters therein, and a pair of rotatable laminating rollers 72A, 72B as heating/pressurizing rollers. The pair of drying rollers 71A, 71B serve to convey the recording medium 23 as an object to be laminated (laminate object) to the pair of laminating rollers 72A, 72B while heating and drying the laminate object by predetermined pressure. The pair of drying rollers 71A, 71B are provided drying the moisture amount excessively remaining in the recording medium 23 uniformly as much as possible. As is in the illustrated image forming apparatus, when the recording medium is subjected to the laminate processing and is passed through the heated contact portion (referred to as "nip portion" hereinafter) of the roller pair, the moisture may be trapped. If the moisture to be evaporated tries to escape from the trapped area, various problems will arise. For example, when the laminate processing is effected from the recorded surface, if the moisture remains, the moisture will be remained as bubbles between the laminate material and the recording medium while the moisture is not shifted as it is, thereby deteriorating the image quality. Further, if the moisture escapes toward the rear surface, longitudinal weak zones of the recording medium may be broken. Namely, generally, since the paper substrate has a back coat which is impossible or hard to permeate the moisture even if the moisture is permeated through the paper substrate, break is generated at an interface between the back coat and the paper substrate, thereby swelling the film. This is one example of so-called Z-axis destruction. On the other hand, if the moisture cannot be passed through the paper substrate, paper fibers are broken within the paper substrate, thereby swelling the recording medium partially. Further, if the moisture is passed through the heating roller pair, the moisture cannot escape in the thrust direction, with the result that the moisture is concentrated into end portions of the recording medium, thereby waving the end portions. Particularly when the image is recorded on the recording medium partially, since the moisture is offset in accordance with the image pattern, considerable waving of the recording medium will occur. Thus, it is more preferable that the drying roller pair be designed not only to evaporate the moisture sufficiently but also to dry the recording medium uniformly. If the drying amount of the recording medium is small or if the recording medium is not dried, the Z-axis destruction will occur during the laminate processing. Regarding such a situation, in most cases, the water vapor is trapped between the recording medium and the laminate material layer, thereby causing a phenomenon that air blocks are confined in the laminate material layer. Further, if the water vapor due to the drying is adhered to the laminate material layer immediately before the laminate processing, a phenomenon similar to that if the drying is insufficient may occur.

A laminate member 75 as a laminate film is carried by a feeding roller 81A, a take-up roller 81B and a separation guide 76, and tension is applied on the laminate member between the feeding roller 81A and the take-up roller 81B to remove wrinkles from the laminate member. The conveyed recording medium 23 and the laminate member 75 are heated and pressurized by the laminating roller pair 72A, 72B, with the result that the laminate member is adhered to the recorded surface of the recording medium. Then, the recording medium passed through the laminating roller pair 72A, 72B is cooled naturally. Then, a laminate substrate (such as PET) of the laminate member 75 is peeled upwardly by the separation guide 76. The laminated recording medium is conveyed to a discharge roller pair 82, 80. Since the upper roller 82 of the discharge roller pair is contacted with the laminated recording medium, it is widely proposed so that the upper roller has a spur-gear configuration or an abacus-like configuration to reduce a contact area between the recording medium and the roller thereby to prevent deterioration of the imaged surface. Further, in many cases, the upper roller is made of soft material such as rubber. The laminated recording medium passed through the discharge roller pair 82, 80 is discharged onto a discharge tray 64.

Next, a general construction of the laminate member 75 will be explained. As material forming the laminate member, generally, thermoplastic resin is widely used. Thermoplastic resin particles are not particularly limited on condition that a protection layer can be formed on an image receiving layer of the recorded recording medium. Thermoplastic resin having preferred properties such as transparency, adhering ability, melting point and anti-blocking ability may be selected appropriately. More specifically, thermoplastic resin particles obtained by polymerizing or co-polymerizing various monomers such as styrene monomer such as styrene, methyl styrene, ethyl styrene, butyl styrene, methoxy styrene, phenyl styrene and chlorostyrene, ethylene unsaturation mono-olefin such as ethylene, propylene and butylene, vinyl halide such as vinyl chloride and vinyl bromide, vinyl ester class such as vinyl propionate, (meta) acrylic acid ester class such as (meta) methyl acrylate, (meta) ethyl acrylate, (meta) propyl acrylate, vinyl methyl ether class such as vinyl methyl ether, vinyl ketone class such as vinyl methyl ketone, N-vinyl compound such as N-vinyl indole, and carboxyl group including monomer such as (meta) acrylonitrile class and (meta) acrylic acid. Further, if necessary, charge control agent may be added.

Further, it is desirable that both a glass transition point (Tg) and a film forming temperature of the thermoplastic resin particles are lower than Tg and a film forming temperature of binder resin included in the image receiving layer of the recording medium.

Figure 3:
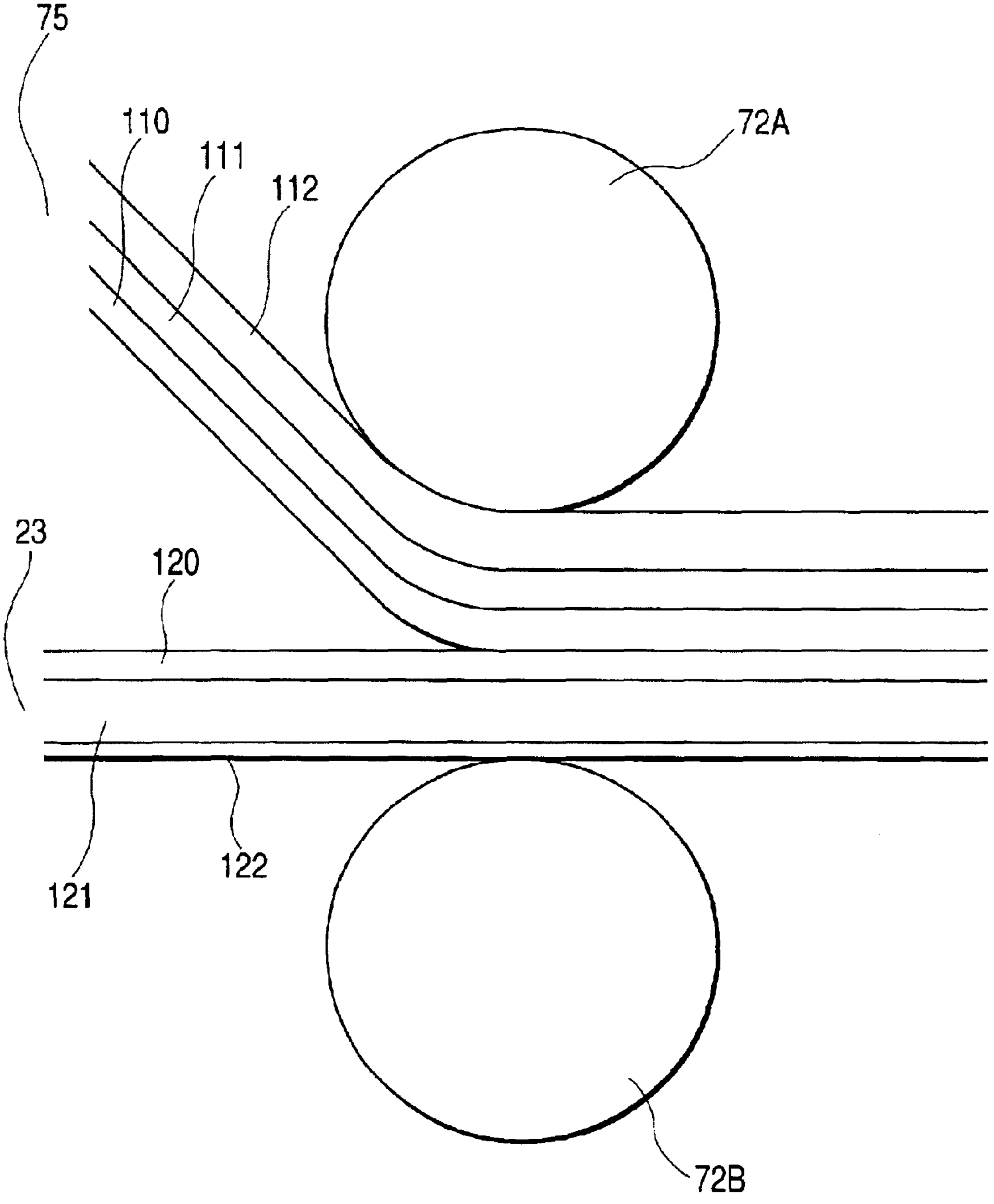
FIG. 3 is a sectional view for explaining a laminating portion according to the first embodiment of the present invention.

Further, it is preferable that resin material conventionally used in multi-component toner such as two-component toner is used. However, normally, request for enhancement of hardness of the protection layer is contrary to request for enhancement of film forming facility of the protection layer. Thus, by using multi-component particles comprised of plural resin materials and by separating functions of the particles based on different properties, these opposed requests can be satisfied. As an example, FIG. 3 shows an example in which a two-layer structure including a TOP layer and an adhesive layer to separate functions. FIG. 3 schematically shows a condition that the recording medium 23 and the laminate member 75 are heated and pressurized by the laminating roller pair 72A, 72B.

As mentioned above, the laminate member 75 is generally constituted by three layers. First of all, a laminate substrate 112 carrying the laminate member is provided. As mentioned above, the laminate substrate 112 is peeled by the separation guide 76 and is collected onto the take-up roller 81 to be discarded. Thus, good separation from other layers is requested. There is also provided a TOP layer 111 as a laminate layer for forming a surface of the recording medium after the laminate substrate 112 is peeled. Thus, the TOP layer 111 is preferably made of material relatively strong to heat and water. Further, there is provided an adhesive layer 110 for adhering the laminate member 75 to the recorded surface of the recording medium 23 uniformly and having a low softening temperature. It is important that the adhesive layer 110 has an adhering force and a penetrating ability into the surface of the recording medium.

Further, although the recording medium according to the illustrated embodiment may be a recording medium for the ink jet recording generally used widely, more preferably, the following recording medium is used. First of all, an ink image receiving layer 120 having porous inorganic particles and binder resin as main components. For the binder resin of 100 weight parts, the porous inorganic particles have preferably 30 to 1000 weight parts, and more preferably, 50 to 500 weight parts. It is desirable that the porous inorganic particles has a structure including fine holes having a diameter 30 to 300 Å, and, particularly, great fine hole density is desirable concentrated near surfaces of the particles. Specific surface area of the porous inorganic particle is desirably greater than 50 $m^2/g$ to obtain a sufficient ink absorbing speed. Further, when a high speed ink jet recording apparatus is used, the ink image receiving layer 120 is desirably includes the porous inorganic particles (having specific surface area greater than 100 $m^2/g$) of 50 weight % or more to prevent overflow of the ink.

It is desirable that the porous inorganic particles having such ink solvent absorbing ability and dye molecule absorbing ability has a white color property, and, as materials for the porous inorganic particles having such abilities, there are oxide, hydrate and carbonate of metals or semi-metals such as aluminium, magnesium and silicon. Among them, synthetic silica is particularly preferable since it has excellent properties, can be manufactured by well-established techniques and is cheap and stable.

In the image receiving layer having the mixture of inorganic particles and organic binder resin, it is desirable that the particle diameter of the inorganic particle is not so small in consideration of the ink absorbing ability. In many cases, inorganic particles having particle diameter of about 0.1 to 10 $\mu$m are used, and, since they are not sufficiently small with respect to light wavelength, light scattering is generated on the surface, thereby providing matte appearance. Among them, in super-fine particles having particle diameter of about 0.1 to 1 $\mu$m, although a glossy surface having reduced matte appearance can be obtained, normally, secondary aggregation is generated, so that the surface can not be so smooth. Further, if dispersant agent is added to coating liquid, the ink absorbing ability and stability of dye molecule may be deteriorated.

For the above-mentioned reasons, the recording medium including the porous inorganic particles satisfying the ink absorbing ability and dye color development stability normally has resulting matte surface, and the present invention is most effective when the present invention is applied to the recording medium having such as ink image receiving layer.

Further, a back coat layer 122 is provided on a rear surface of the paper substrate 121. In this structure, in a case where the environment (particularly, humidity) within which the recording medium is located is changed, when moisture is absorbed and discharged, if expansion ratio differs between the paper substrate 121 and the ink image receiving layer 120, curl will occur. Thus, it is general that the coat layer having the similar expansion ratio to that of the receiving layer is coated on the rear surface of the paper substrate. Further, in the ink jet recording system generally used widely, since water-based ink is used, if the moisture is permeated into the back surface of the recording medium after the recording the image is ink-stained. By forming the back coat layer 122, the problems can be solved, and such back coat layer has widely been used in high quality output applications.

As mentioned above, in the image forming apparatus having laminate means for forming the laminate material layer on the surface layer of the recording medium by utilizing heat or heat/pressure after the image was recorded on the recording medium by the ink jet recording system for recording the image by using the ink, there is provided the drying step in which the pair of or the plurality of rollers are heated and the recording medium is passed through between the rollers during the laminate processing after the image recording, so that the moisture is prevented from being trapped between the laminate layer and the recording medium thereby to prevent deterioration of the image and the waving of the recording medium during the laminate processing.

Figure 4:
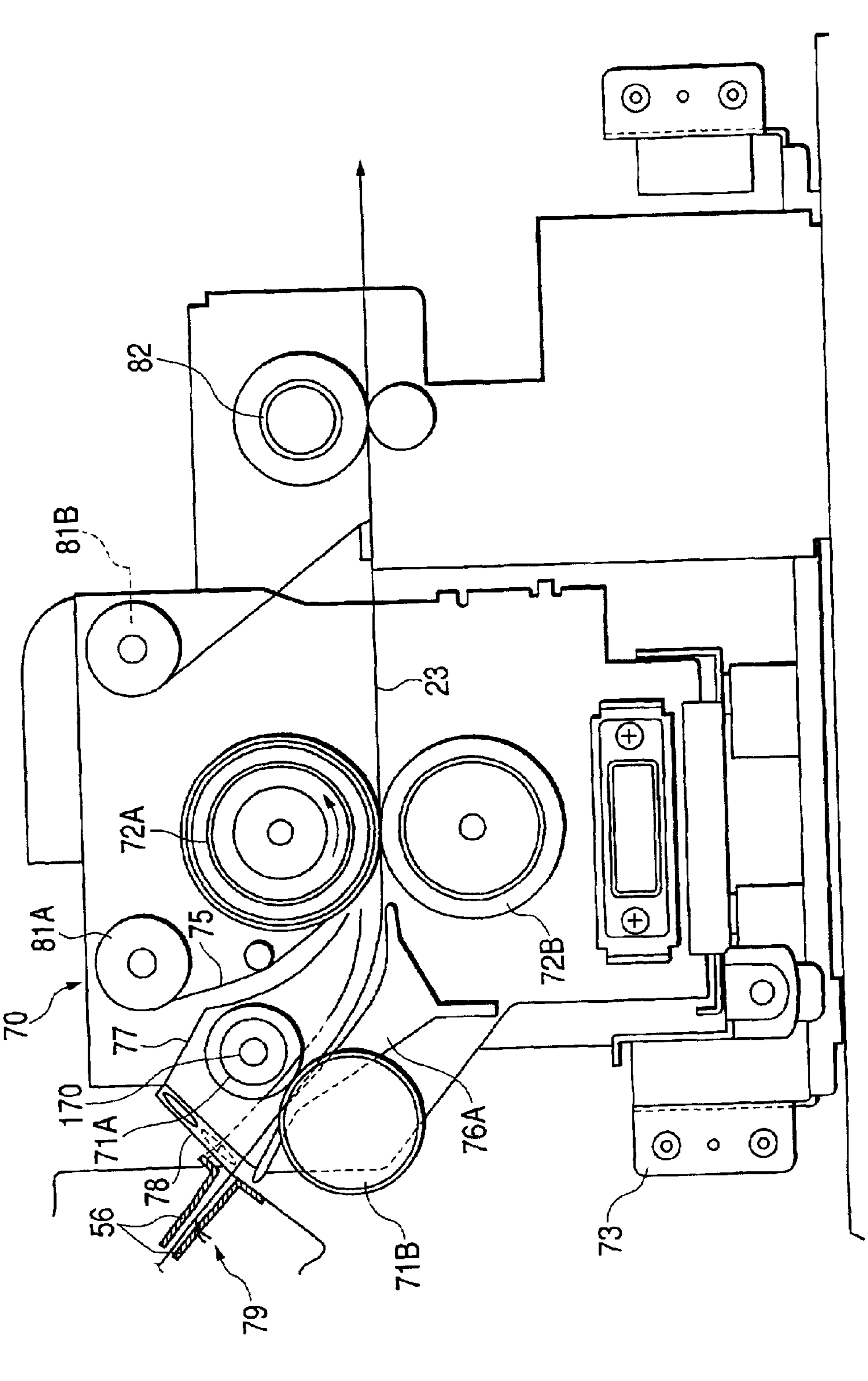
FIG. 4 is a sectional view for explaining a laminating portion according to the first embodiment of the present invention.

Next, the laminating portion 70 will be explained with reference to FIG. 4. FIG. 4 is an enlarged sectional view of the laminating portion 70 of FIG. 1. In the laminating portion 70, a leading end of the recording medium 23 is detected by a paper sensor lever 79. Then, the recording medium 23 is conveyed to the drying roller pair 71A, 71B. A temperature of the drying roller pair 71A, 71B is previously adjusted to a predetermined temperature T1. When the recording medium 23 is conveyed, the temperature is changed to a temperature T2 greater than the temperature T1. In order to dry the recording medium efficiently, a cylindrical halogen heater is provided at a rotational center of the drying roller 71A contacting with the recorded surface of the recording medium 23, and, if the temperature is decreased below the set temperature, the heater is turned ON, and, if the temperature is greater than the set temperature, the heater is turned OFF. The drying roller 71A is constituted by coating a tetrafluoroethylene resin layer having a thickness of 20 μm on an aluminum core having a thickness of 2 mm, which roller good thermal efficiency and easy temperature adjustment and easy changing of the set temperature. In order to prevent paper powder and/or coat powder of the recording medium from the adhering onto the surface of the roller, coating of ethylene resin is provided. Other than the provision of the coating of ethylene resin, various coatings may be provided or a tube-shaped layer may be provided on the surface by heat contraction or may be adhered to the surface by using an anchor coat layer. Further, as material for the core, other than fluororesin, silicon resin or elastomer may be used. Further, as the heating method, a ceramic heater may be used or the drying rollers may be heated externally.

In the illustrated embodiment, an outer peripheral length of the lower drying roller 71B is set to be greater than a distance between the paper sensor lever 79 and the nip portion of the drying roller pair 71A, 71B. With this arrangement, before the lower drying roller 71B is rotated by one revolution after the leading end of the recording medium 23 is detected by the paper sensor layer 79 and the set temperature of the drying roller 71A was changed from T1 to T2, the recording medium 23 is inserted into the nip portion.

If the temperature is originally set to a temperature for drying the recording medium 23, the upper drying roller 71A and the lower drying roller 71B will reach an equilibrium condition with predetermined temperature difference. In the illustrated embodiment, the temperature difference of about 20° C. with respect to the adjusted temperature of 180° C. was ascertained.

However, even when T1 is set to 173° C. and T2 is set to 180° C. and the adjusted temperature is changed from T1 to T2, since the recording medium 23 enters into the nip portion before the lower drying roller 71B is rotated by one revolution, heat corresponding to a temperature increasing amount of the upper drying roller 71A is transferred to the recording medium 23 without being absorbed by the lower drying roller 71B. Since the upper drying roller 71A includes the halogen heater 170, the surface temperature of the upper drying roller 71A is increased moderately. In the illustrated embodiment, the temperature is increased at a rate of about Δ1° C./sec. Further, an outer diameter of the upper drying roller 71A was selected to 30 mm and an outer diameter of the lower drying roller 71B was selected to 50 mm and a conveying speed of the recording medium 23 was selected to 20 mm/sec. That is to say, when it is assumed that the time point when the leading end of the recording medium 23 is detected by the paper sensor lever 79 and the adjusted temperature is changed from T1 to T2 is a base or original time point, one revolution of the upper drying roller 71A requires about 4.7 seconds and one revolution of the lower drying roller 71B requires about 7.9 seconds, and 7 seconds are required until the temperature of the upper drying roller 71A reaches the temperature T2. Thus, when it is set that the leading end of the recording medium 23 enters into the nip portion between 7 seconds and 7.9 seconds, the temperature increase of the lower drying roller 71B during the conveyance of the recording medium 23 can be suppressed as great as possible. Accordingly, in the drying step for the recording medium 23, by suppressing the Z-axis destruction of the recording medium and by preventing the rear surface coat material widely used to prevent curl from adhering to the lower drying roller 71B, occurrence of poor conveyance can be prevented.

Incidentally, in the illustrated embodiment, as mentioned above, the diameter of the upper drying roller 71A is smaller than that of the lower drying roller 71B. The reason is that the fact that the temperature of the surface of the lower drying roller 71B is increased totally is suppressed during the temperature increase of the upper drying roller 71A. However, the image is not always formed on the area near the leading end of the recording medium, and, even when the halogen heater 170 is turned OFF at the temperature T2, the temperature may be increased above T2 due to overshoot, and it is not required that the insertion of the recording medium is waited until the temperature of the upper drying roller 71A reaches T2. Thus, since it is not always required that the insertion of the recording medium into the nip portion is waited, the recording medium may be inserted into the nip portion a little earlier. That is to say, it is not always required that the diameter of the upper drying roller 71A is smaller than that of the lower drying roller 71B.

Second Embodiment

In the first embodiment, while an example that the drying roller pair is constituted by the two rollers was explained, in a second embodiment of the present invention, a drying roller pair is constituted by three rollers.

Figure 5:
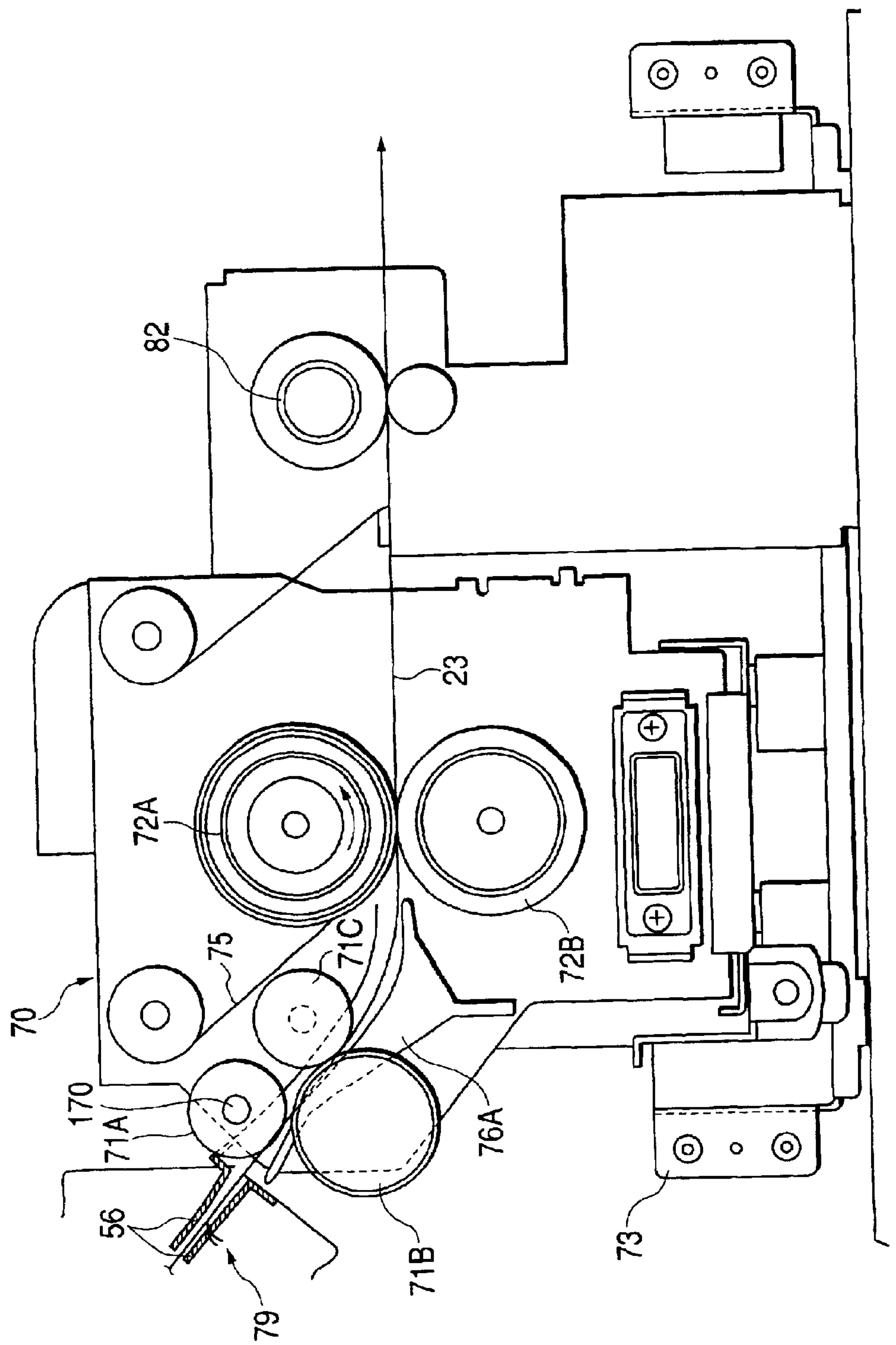
FIG. 5 is a sectional view for explaining a laminating portion according to a second embodiment of the present invention.

FIG. 5 is a sectional view for explaining a laminating portion according to the second embodiment of the present invention. In FIG. 5, an upper drying roller 71A and a drying press roller 71C are disposed at a side of the recorded surface of the recording medium 23 and a lower drying roller 71B is disposed at a side of the rear surface. The upper drying roller 71A includes a halogen heater 170 at a center thereof. The upper drying roller 71A and the drying press roller 71C are biased against the lower drying roller 71B with total pressure of 5 to 10 kgf. In the illustrated embodiment, an area for contributing to the heating and drying of the recording medium 23 corresponds to an area of the recording medium supported by the upper drying roller 71A and the drying press roller 71C. That is to say, such an area is the sum of area of nip potions and an area between the nip portions. Further, a rotational speed of the drying press roller 71C is set to be greater than that of the upper drying roller 71A by about 1% to 3% so that the recording medium 23 is contacted with the upper drying roller 71A and the lower drying roller 71B.

In the illustrated embodiment, when the recording medium absorbing liquid such as ink is passed through the nip portion between the upper drying roller 71A and the lower drying roller 71B, the recorded surface of the recording medium 23 substantially reaches the temperature of the upper drying roller 71A. When the ink starts to be dried, since any pressure does not acts on the recorded surface of the recording medium until the recording medium 23 reaches the nip portion between the drying press roller 71C and the lower drying roller 71B, water vapor can escape into atmosphere in a free condition. That is to say, since the water vapor does almost not shift in the rear surface direction and the thrust direction, any problem regarding the waving of the recording medium due to offset image pattern does not occur.

Incidentally, this embodiment can be adopted so long as the recording medium can be passed between three rollers, and a driving method and arrangement of the rollers are not limited specially.

According to the above-mentioned arrangement, since the drying is promoted by gradually increasing the temperature, it is effective particularly when the recording medium contains much moisture.

Third Embodiment

In the first embodiment, while an example that the film-shaped laminate material is adhered to the recording medium was explained, in a third embodiment of the present invention, a recording medium in which a porous layer is previously coated on an ink absorbing layer is heated and pressurized, thereby melting the porous layer to form a laminate layer.

Figure 6:
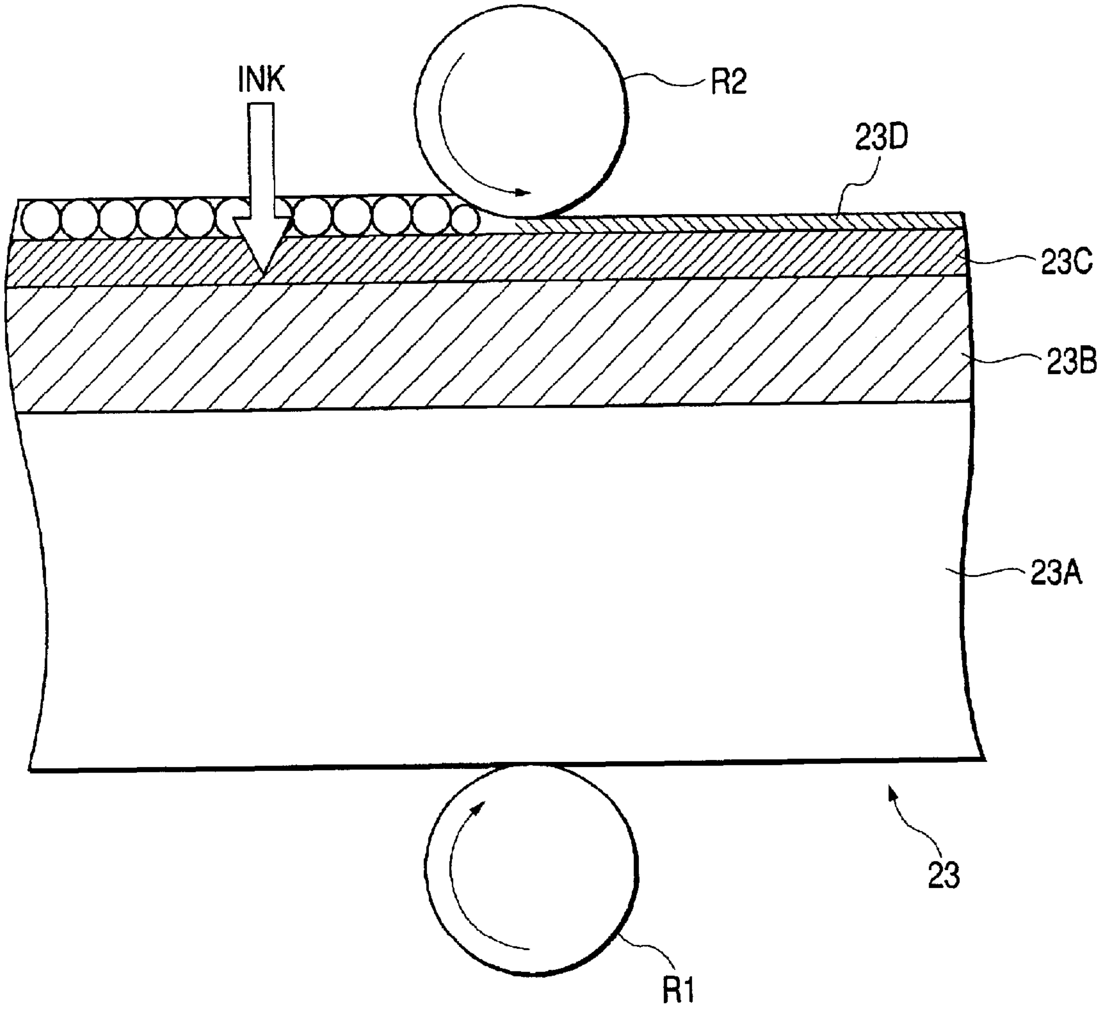
FIG. 6 is a sectional view for showing a section of a coat portion which is applied to a third embodiment of the present invention and for explaining a laminating operation.

FIG. 6 is a sectional view for showing a section of a coat paper applied to the third embodiment and for explaining an laminating operation. In FIG. 6, the recording medium 23 previously includes a laminate material layer 23D on a recorded surface thereof. The recording medium 23 comprised of a substrate material 23A, a (preferably white) layer 23B, a recording layer 23C for absorbing and catching ink or coloring agent substantially, and the laminate material layer 23D has been preferably used in the past. The laminate material layer 23D serves to receive the ink directly and has a liquid permeating ability and also has a property that the ink or visualizing agent is not remained substantially. That is to say, the recording method effected in the recording portion 20 does not differ from that in the first embodiment.

Figure 7:
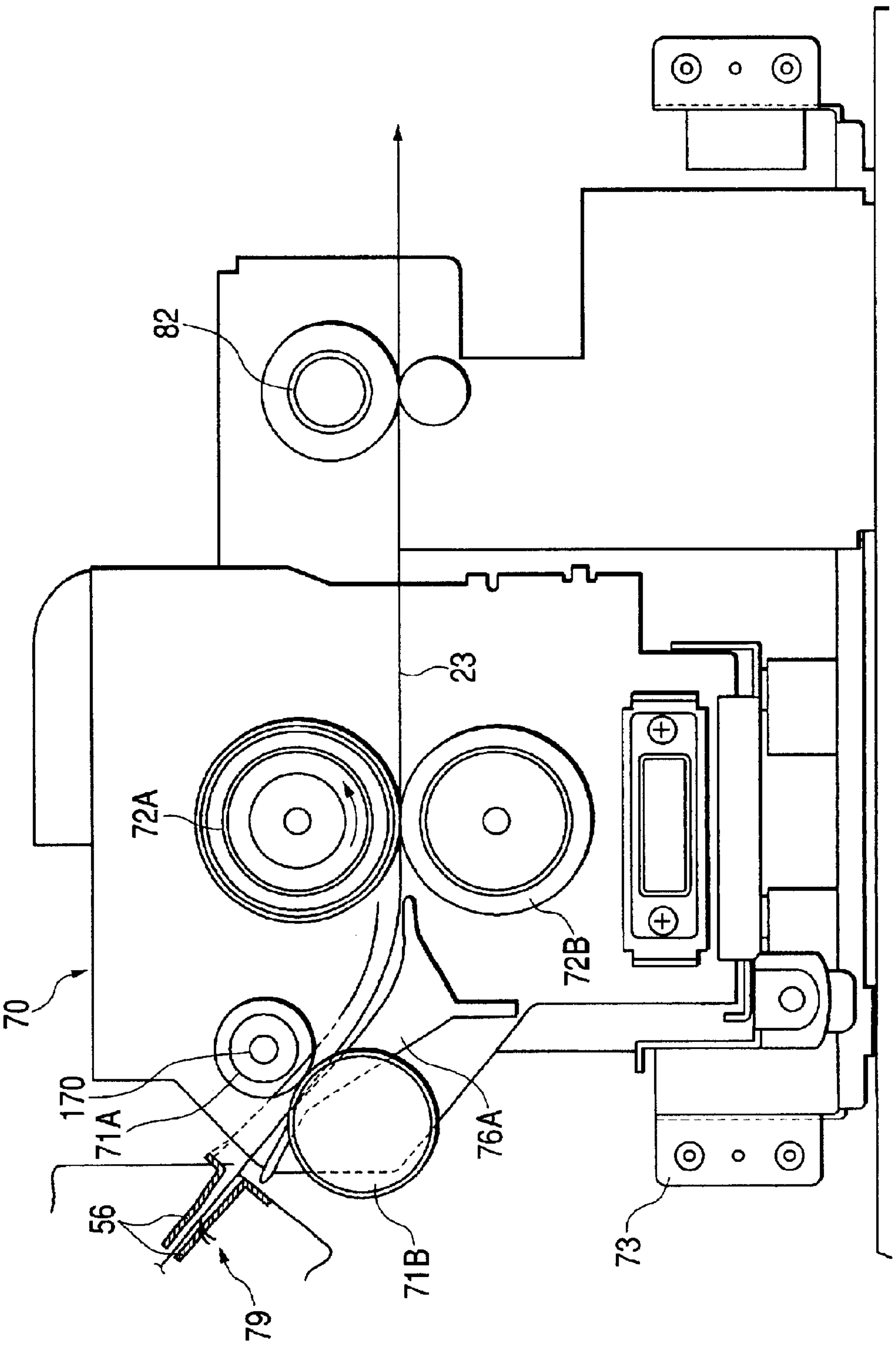
FIG. 7 is a sectional view for explaining a laminating portion according to the third embodiment of the present invention.

FIG. 7 is a sectional view for explaining a laminating portion according to the third embodiment of the present invention. After the recording medium 23 conveyed to the laminating portion 70 is detected by a paper sensor lever 79, the recording medium is dried by a pair of drying rollers 71A, 71B and is subjected to laminate processing by a pair of laminating rollers 72A, 72B.

Next, the recording medium according to the illustrated embodiment will be explained. First of all, as material of the ink receiving layer 23C, alumina hydrate is used. In accordance with a method disclosed in U.S. Pat. No. 4,242,271, alumina octaxide was formed and was subjected to hydrolysis to manufacture alumina slurry. Water was added to the alumina slurry until solid component of the alumina hydrate became 5%. Then, after the temperature was increased to 80° C. and aging reaction was effected for 10 hours, colloidal sol was subjected to spray drying to obtain the alumina hydrate. Further, the alumina hydrate was mixed and dispersed in ion-exchanged water and was adjusted by nitric acid to have pH 10. The aging time was set to 5 hours to obtain the colloidal sol. After the colloidal sol was subjected to desalting treatment deflocculating treatment was effected by adding acetic acid. The alumina hydrate obtained by drying the colloidal sol was measured by X-ray diffraction, with the result that it was pseudo-bemite. The colloidal sol of the alumina hydrate was concentrated to obtain solution of 15 weight %. On the other hand, polyvinyl alcohol (trade name: PVA117 manufactured by Kurare Co., Ltd.) was solved in ion-exchanged water to obtain solution of 10 weight %. These two solutions were mixed so that weight ratio between solid component of the alumina hydrate and solid component of the polyvinyl alcohol became 10:1, and dispersion liquid was obtained by agitating. The dispersion liquid was dye-coated on base materials 23A, 23B of baryta elementary paper on which a white baryta layer was coated to form a porous layer including pseudo-bemite having a thickness of 40 $\mu$m. Vinyl chloride/vinyl acetate latex (as a laminate layer) having solid component of 15% (trade name: Vinyl-bran 602 manufactured by Nissin Chemical Industry) was dye-coated on the porous layer and was dried at a temperature of 70° C. to form a porous latex layer having a thickness of about 5 $\mu$m. In this way, the recording medium having the laminate layer and the ink receiving layer was obtained.

According to the above-mentioned arrangement, also regarding the recording medium having the laminate layer, an image forming apparatus in which a laminating speed is increased and energy consumption is reduced without making the apparatus bulky can be provided.

Fourth Embodiment

In the first embodiment, while an example that the laminate processing is effected by heating and pressurizing the recording medium 23 and the laminate member 75 by means of the laminating roller pair 72A, 72B was explained, in a fourth embodiment of the present invention, laminate processing is effected by a heat (or thermal) transferring head.

Figure 8:
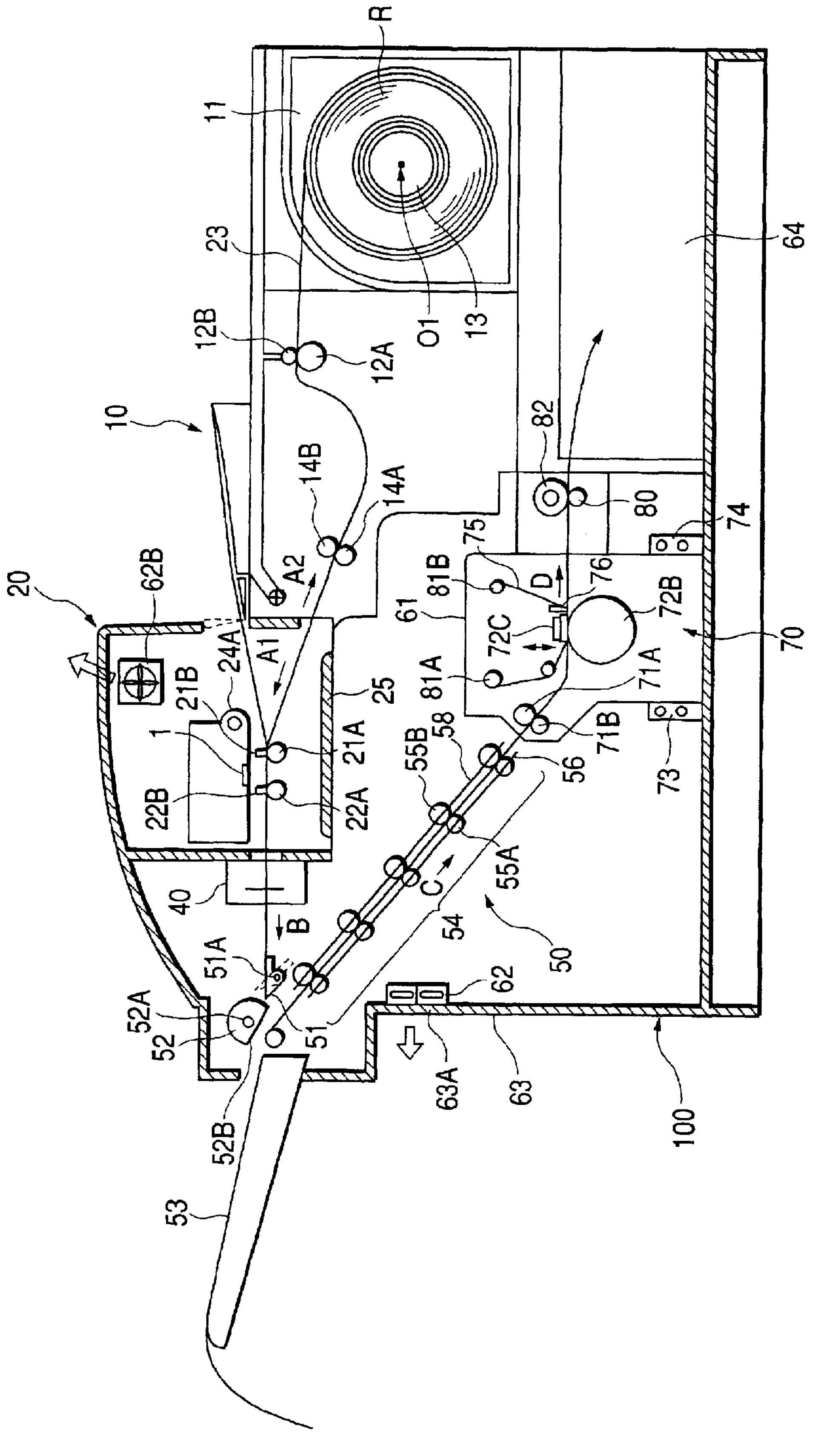
FIG. 8 is a sectional view of an image forming apparatus according to a fourth embodiment of the present invention.
Figure 9:
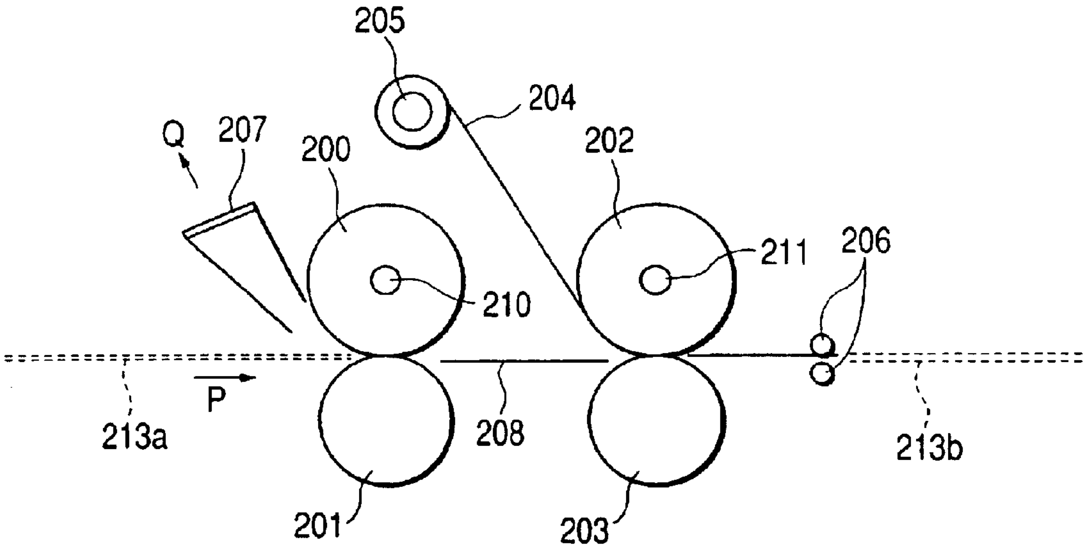
FIG. 9 (PRIOR ART)
FIG. 9 is a sectional view of a conventional laminating apparatus.

FIG. 8 is a sectional view of an image forming apparatus 100 according to the fourth embodiment of the present invention. In FIG. 8, a heat transferring head 72C is provided. A heat transferring film is carried by a feeding roller 81A, a take-up roller 81B and a separation guide 76, and tension is applied onto the film between the feeding roller 81A and the take-up roller 81B to remove wrinkles. A conveyed recording medium 23 and a laminate member 75 are conveyed between the heat transferring head 72C and a laminating roller 72B. The heat transferring head 72C is energized by a substantially image width or length corresponding to a width of the recording medium. Transparent resin, wax or both is transferred onto the recorded surface of the recording medium 23 from the heat transferring film, thereby forming a transparent protection layer. A substrate material of the heat transferring film carrying the protection layer is peeled upwardly by the separation guide 76 and is wound around the take-up roller 81B. The laminated recording medium is conveyed by a pair of discharge rollers 82, 80.

In the heat transferring system, since thin film resin or wax coated on the thin film substrate material having good heat transfer rate (or thermal conduction rate) is thermally melted by instantaneous heating rather than pressurizing and is transferred onto the recording medium, a heating amount is not so great. Thus, the heating amount is small in comparison with the arrangement in which the laminate processing is effected by the laminating rollers. Namely, since the instantaneous heating may be used without the pressurizing force, the constructural parts and energy consumption may be smaller, and cost-down and compactness of the image forming apparatus can be achieved.

Further, in the above-mentioned embodiments, while an example that the present invention is applied to the recording apparatus of serial type for shifting the recording heads in a main scanning direction was explained, the present invention can be applied to a recording apparatus of full-line type in which an image is recorded by a recording head extending across the entire width of a recording sheet while conveying the recording sheet continuously.

Further, in the above-mentioned embodiments, while an example that the recording heads of so-called BJ type amount the ink jet types are used was explained, the present invention is not limited to such recording heads, but can be allied to various recording systems. The recording system of the recording heads may be, for example, a piezo-system, other than the BJ system.

According to the present invention, since the control is effected to change the temperature of the drying means between before and when the laminate object is conveyed to said drying means, the laminating speed can be increased without making the apparatus bulky, and useless energy consumption can be reduced while maintaining the required drying amount.

What is claimed is:

1. A laminating apparatus comprising:

conveying means for conveying a laminating object;

drying means for drying the laminating object conveyed by said conveying means;

laminate means for effecting laminate processing on the laminating object dried by said drying means; and control means for controlling a temperature of said drying means so that the temperature of said drying means is adjusted to a predetermined temperature T1 when the laminating object is being conveyed by said conveying means before the laminating object arrives at said drying means and so that the temperature of said drying means is adjusted to a predetermined temperature T2 greater than the temperature T1 when the laminating object is being dried by said drying means, wherein the laminating object is a recording medium on which an image was formed by discharging ink from a recording head.

2. A laminating apparatus according to claim 1, wherein said drying means includes an upper drying roller for contacting with a surface, to be subjected to the laminate processing, of the laminating object, and a lower drying roller for contacting a back surface of the laminating object, and said upper laminating roller has a heater.

3. A laminating apparatus according to claim 2, wherein, before said lower drying roller is rotated by one revolution after the temperature is changed by said heater, the laminating object is conveyed to a nip between said upper drying roller and said lower drying roller.

4. A laminating apparatus according to claim 1, wherein said laminate means includes a heat transferring head disposed at a side of a surface, to be subjected to the laminate processing, of the laminating object, and a roller disposed at a side of a back surface of the laminating object.

5. A laminating apparatus according to claim 4, wherein said heat transferring head has an electrothermal converter.

6. A laminating apparatus according to claim 1, wherein the recording head has an electrothermal converter for generating thermal energy utilized in discharging of the ink.

7. An image forming apparatus comprising:

recording means for forming an image on a recording medium by discharging ink;

conveying means for conveying the recording medium on which an image is formed by said recording means;

drying means for drying the recording medium conveyed by said conveying means;

laminate means for effecting laminate processing on the recording medium dried by said drying means; and control means for controlling a temperature of said drying means so that the temperature of said drying means is adjusted to a predetermined temperature T1 when the laminating object is being conveyed by said conveying means before the recording medium arrives at said drying means, and so that the temperature of said drying means is adjusted to a predetermined temperature T2 greater than the temperature T1 when the recording medium is being dried by said drying means, wherein said control means adjusts the temperature of said drying means to the predetermined temperature T2 after forming of the image on the recording medium by said recording means is completed.

* * * * *

UNITED STATES PATENT AND TRADEMARK OFFICE

CERTIFICATE OF CORRECTION

PATENT NO. : 6,799,620 B2
DATED : October 5, 2004
INVENTOR(S) : Nobuhiko Takekoshi It is certified that error appears in the above-identified patent and that said Letters Patent is hereby corrected as shown below:

Column 6,
Line 26, “will be remained” should read -- still remains --.

Column 10,
Line 46, “waited” should read -- awaited --.
Line 49, “waited,” should read -- awaited, --.

Column 11,
Line 5, “potions” should read -- portions --.
Line 53, “remained” should read -- retained --.

Signed and Sealed this

Fifth Day of April, 2005

JON W. DUDAS
*Director of the United States Patent and Trademark Office*